United States Patent
Tsai

(10) Patent No.: US 8,339,787 B2
(45) Date of Patent: Dec. 25, 2012

(54) HEAT VALVE FOR THERMAL MANAGEMENT IN A MOBILE COMMUNICATIONS DEVICE

(75) Inventor: Richard Tsai, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 307 days.

(21) Appl. No.: 12/877,219

(22) Filed: Sep. 8, 2010

(65) Prior Publication Data

US 2012/0057303 A1    Mar. 8, 2012

(51) Int. Cl.
*H05K 7/20* (2006.01)
*H01H 37/00* (2006.01)
*F28D 15/00* (2006.01)
*F28F 7/00* (2006.01)

(52) U.S. Cl. ............... 361/704; 337/298; 165/104.33; 165/185

(58) Field of Classification Search .................. None
See application file for complete search history.

(56) References Cited

U.S. PATENT DOCUMENTS

| | | | | |
|---|---|---|---|---|
| 5,107,330 A * | 4/1992 | Dahringer | ................. | 257/718 |
| 5,379,601 A * | 1/1995 | Gillett | ................. | 62/51.1 |
| 5,459,544 A * | 10/1995 | Emura | ................. | 396/257 |
| 5,808,539 A * | 9/1998 | White | ................. | 337/379 |
| 5,825,275 A * | 10/1998 | Wuttig et al. | ................. | 337/139 |
| 5,879,832 A * | 3/1999 | Vu et al. | ................. | 429/62 |
| 6,245,400 B1 * | 6/2001 | Tzeng et al. | ................. | 428/40.1 |
| 6,278,607 B1 * | 8/2001 | Moore et al. | ................. | 361/679.54 |
| 6,294,977 B1 * | 9/2001 | Kalapodis et al. | ................. | 337/140 |
| 6,333,772 B1 * | 12/2001 | Mori et al. | ................. | 349/161 |
| 6,388,554 B1 * | 5/2002 | Yamaguchi | ................. | 337/401 |
| 6,531,947 B1 * | 3/2003 | Weaver et al. | ................. | 337/139 |
| 6,628,522 B2 * | 9/2003 | Trautman et al. | ................. | 361/704 |
| 6,982,874 B2 | 1/2006 | Smalc et al. | | |
| 7,107,777 B2 * | 9/2006 | Vaiyapuri et al. | ................. | 62/259.2 |
| 7,154,369 B2 * | 12/2006 | Dietz et al. | ................. | 337/394 |
| 7,161,809 B2 | 1/2007 | Ford et al. | | |
| 7,211,742 B2 * | 5/2007 | Moore et a | ................. | 174/539 |
| 7,349,221 B2 * | 3/2008 | Yurko | ................. | 361/719 |
| 7,486,517 B2 | 2/2009 | Aapro et al. | | |
| 7,752,866 B2 * | 7/2010 | Vaidyanathan et al. | ................. | 62/383 |
| 7,755,899 B2 * | 7/2010 | Stenmark | ................. | 361/710 |
| 2004/0212718 A1 | 10/2004 | Hiltunen et al. | | |
| 2006/0152328 A1 * | 7/2006 | Robert | ................. | 337/333 |
| 2007/0257766 A1 * | 11/2007 | Richards et al. | ................. | 337/298 |
| 2008/0205004 A1 * | 8/2008 | Ueno | ................. | 361/701 |
| 2009/0168363 A1 * | 7/2009 | Clayton et al. | ................. | 361/714 |
| 2009/0218087 A1 * | 9/2009 | Oshima | ................. | 165/185 |

* cited by examiner

*Primary Examiner* — Lisa Lea Edmonds
*Assistant Examiner* — Xanthia C Cunningham
(74) *Attorney, Agent, or Firm* — Blakely, Sokoloff, Taylor & Zafman LLP

(57) ABSTRACT

A thermal valve for controlling heat transfer between two electronic components is disclosed. The thermal valve includes a first thermally conductive strip that is secured to the first electronic component and a second thermally conductive strip that is secured to the second electronic component. The first strip and the second strip are located between the two electronic components. The first strip changes its shape toward making contact with the second strip in response to a temperature increase of the first electronic component, and the second strip changes its shape away from making contact with the first strip in response to a temperature increase of the second electronic component. Other embodiments are also described and claimed.

25 Claims, 5 Drawing Sheets

HEAT VALVE FOR THERMAL MANAGEMENT IN A MOBILE COMMUNICATIONS DEVICE

An embodiment of the invention relates to thermal management of a camera module within a mobile device. Other embodiments are also described and claimed.

BACKGROUND

A camera module contains an image sensor that may produce a lot of heat when capturing many images, for example, in a video mode of operation. If the heat cannot be dissipated in time, the temperature of the image sensor will rise beyond its rated temperature, which degrades the quality of the image captured by the image sensor and shortens the life of the image sensor. Heat generated by the image sensor must therefore be dissipated to improve the quality of the image captured by the image sensor and to prevent premature failure. Heat sinks are often used to transfer heat from a heat load to a cold source. Transferring heat from the heat load to the cold source through the heat sink cools the heat load and may maintain the temperature of the heat load within a specified range. Mobile devices, however, have very confined spaces thus limiting the heat sink option.

SUMMARY

A thermal valve for controlling heat transfer between two electronic components, such as a camera module and a main logic board in a mobile device, is described. The thermal valve includes two thermally conductive strips. One thermally conductive strip may be secured to the camera module along an edge and extends toward the main logic board. The other thermally conductive strip may be secured to the main logic board along an edge and extends toward the camera module. The strips are positioned so that they are separated but able to make contact with each other under certain temperature conditions.

The thermal valve may have two states, including a decoupled state and a coupled state. In the decoupled state, the two thermally conductive strips do not contact each other. The thermal valve may be in the decoupled state under three different temperature conditions: one such condition may be when essentially no heat or insufficient heat is being generated by both the camera module and the main logic board; another such condition may be when the temperature of the camera module is low and the temperature of the main logic board is high; and a third condition may be when the temperature of both the camera module and the main logic board are high. In the coupled state, the two thermally conductive strips contact each other so that heat may be transferred between the camera module and the main logic board in an effort to cool the camera module using the main logic board as a heat sink. The thermal valve may be in the coupled state when the temperature of the camera module is high while the temperature of the main logic board is low.

The thermally conductive strip may include two different thermally conductive materials that are laminated together. The two thermally conductive materials have different coefficients of thermal expansion so that the strip may change its shape in response to temperature changes. For example, the strip may be straight at room temperature and curved at a temperature that is above a certain threshold. This threshold may be the rated temperature of the camera module (which is higher than room temperature). When the camera module and the main logic board are essentially at room temperature (i.e., essentially no heat is being generated), the strips may be straight so that the thermal valve is in the decoupled state. When the temperature of the camera module becomes high while the temperature of the main logic board remains low, the strip that is secured to the camera module may curve towards and make contact with the strip that is secured to the main logic board, to thermally couple the camera module to the main logic board and enhance heat transfer from the camera module to the main logic board (to help cool the camera module). When the temperature of the main logic board becomes high, the strip that is secured to the main logic board may curve away from the strip that is secured to the camera module to reduce thermal coupling of the camera module and the logic board. This may represent the understanding that the main logic board is too hot to act as a heat sink for the camera module.

The thermal valve may have multiple pairs of such strips arranged in an array. For example, a set of multiple strips may be secured to the camera module in a linear array. Another set of multiple strips may be secured to the main logic board. Each strip on the camera module may curve to contact a corresponding strip on the main logic board. The arrangement of strips in a linear array may provide increased heat transfer between the camera module and the main logic board using the board as a heat sink for the camera module.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Embodiments of the invention will now be described with reference to the drawings summarized below. The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions, and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
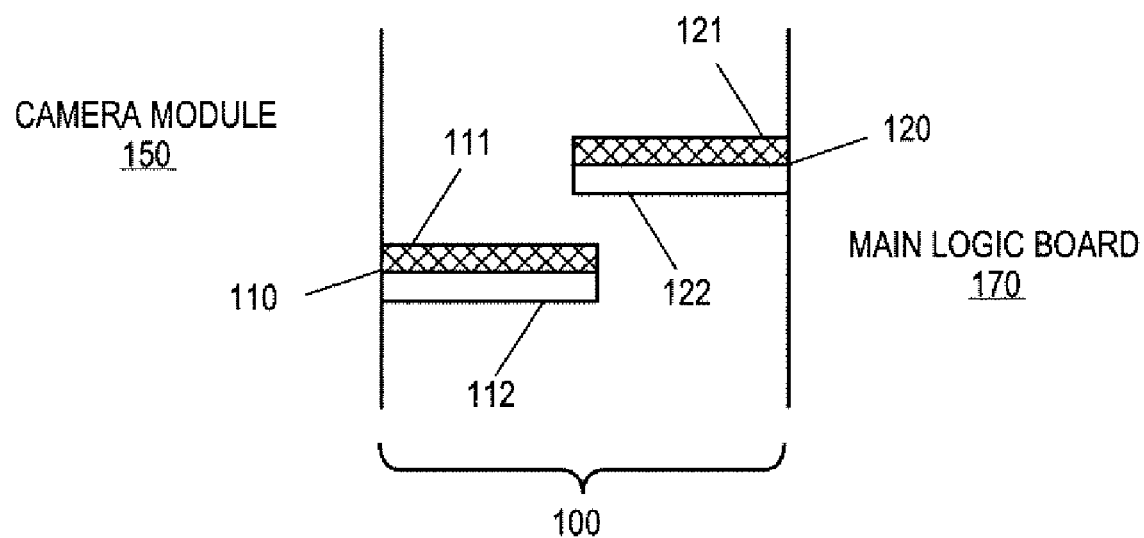
FIG. 1 shows a thermal valve when essentially no heat is generated by a camera module and a main logic board.

Referring to FIG. 1, a thermal valve 100 according to an embodiment is shown. The thermal valve 100 may include two thermally conductive strips 110 and 120. The thermal valve 100 is positioned between two electronic components. The electronic components may be active electronic components. An active electronic component requires power to operate and generates heat during operation. Examples of active components include image sensor arrays, transistors, amplifiers, logic gates, and logic boards (including memory modules).

Strip 110 of the thermal valve 100 may be secured to one electronic component, such as a camera module 150. Strip 120 of the thermal valve 100 may be secured to another electronic component, such as a main logic board 170. The thermal valve 100, the camera module 150, and the main logic board 170 may be integrated within the housing of a mobile device. A mobile device is an electronic portable device that can be used as intended while being carried in the user's hand. Examples of a mobile device include a smart phone, an MP3 player, a digital camera, and a tablet computer.

Strip 110 may include two layers 111 and 112 of two different thermally conductive materials that are laminated together to form the strip 110. The materials of layer 111 and 112 of strip 110 have different coefficients of thermal expansion to cause the strip 110 to change its shape, such as curving and straightening, in response to temperature changes of the camera module 150. For example, when the camera module 150 increases in temperature, layer 112 expands more than layer 111, causing the strip 110 to curve. When the camera module 150 decreases in temperature, the strip 110 straightens.

Similarly, strip 120 may include two different layers 121 and 122 of two different thermally conductive materials that are laminated together to form strip 120. The materials of layers 121 and 122 of strip 120 have different coefficients of thermal expansion to cause the strip 120 to change its shape, such as curving and straightening, in response to temperature changes of the main logic board 170. For example, when the main logic board 170 increases in temperature, layer 122 expands more than layer 121, causing the strip 120 to curve. When the main logic board 170 decreases in temperature, the strip 120 straightens.

Layer 111 of strip 110 and layer 121 of strip 120 may be the same material, and layer 112 of strip 110 and layer 122 of strip 120 may be the same material, such that the strips 110 and 120 behave similarly under similar temperature ranges. Alternatively, layer 111 of strip 110 may be a different material from layer 121 of strip 120, and layer 112 of strip 110 may be a different material from layer 122 of strip 120, such that the strips 110 and 120 behave similarly but under different temperature ranges.

Figure 2:
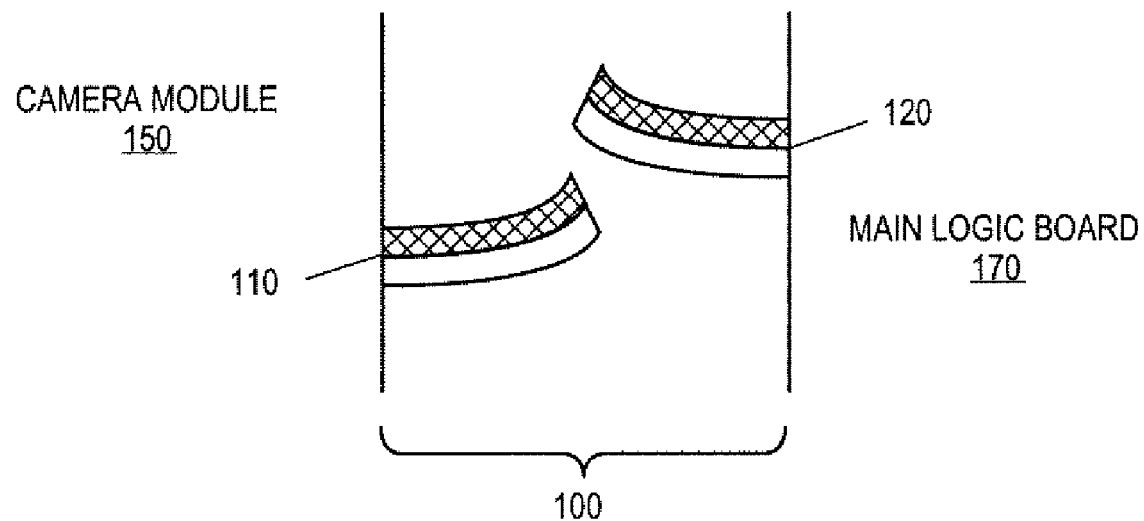
FIG. 2 shows the thermal valve when heat is being generated so that the temperatures of the camera module and the main logic board are high.

Strip 110 may be secured to the camera module 150 along one of its edges and extends toward the main logic board 170. Strip 120 may be secured to the main logic board 170 along one of its edges and extends toward the camera module 150. Strip 110 and strip 120 may be positioned such that they are separated (i.e., do not touch each other). In the example shown here, this occurs when strip 110 and strip 120 are both essentially straight, as shown in FIG. 1, and when strip 110 and strip 120 are both curved, as shown in FIG. 2. Strip 110 and strip 120 are oriented so that they curve, bend, or curl in the same direction in response to temperature increases, as shown in FIG. 2. In FIG. 2, strip 110 curves toward strip 120, and strip 120 curves away from strip 110 (with increasing temperature). Strip 110 and strip 120 are at a distance such that strip 110 makes contact with strip 120 only when strip 110 is hot enough to curve toward strip 120 while strip 120 is cool enough to remain essentially straight, as shown in FIG. 3.

Figure 4:
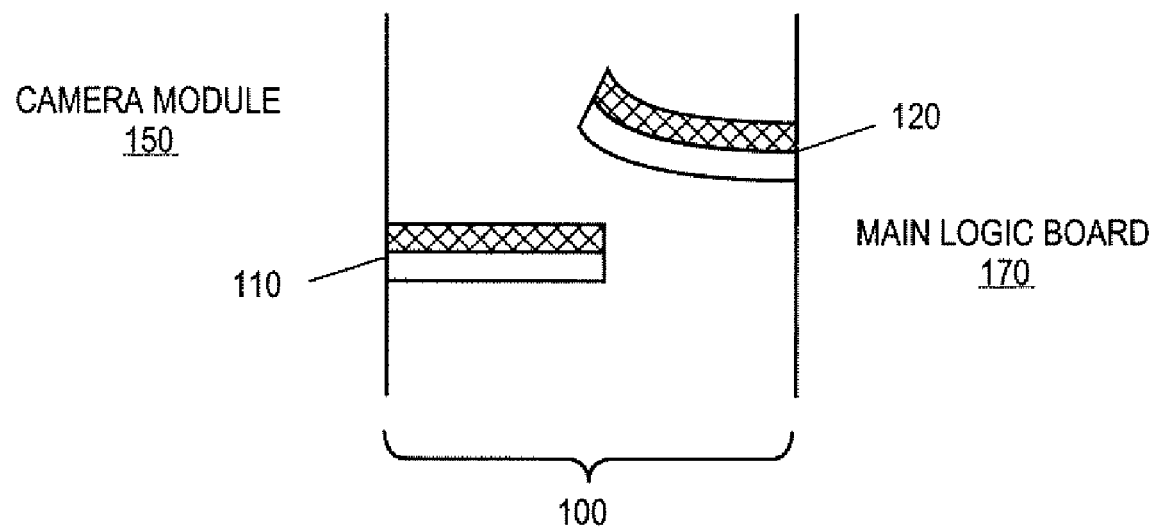
FIG. 4 shows the thermal valve when the temperature of the camera module is low and the temperature of the main logic board is high.

The thermal valve 100 may have two operating states responsive to temperatures of the camera module 150 and the main logic board 170, including a decoupled state and a coupled state. FIG. 1, FIG. 2, and FIG. 4 show the thermal valve 100 in the decoupled state. The thermal valve 100 is in the decoupled state when the strips 110 and 120 are separated and do not contact each other. In the decoupled state, the thermal valve 100 thermally decouples the camera module 150 and the main logic board 170. The camera module 150 may need to be thermally decoupled from the main logic board 170 when the temperature of the camera module 150 is low or when the temperature of the main logic board 170 is high. Thermally decoupling the camera module 150 from the logic board 170 creates decreased thermal conductance between the camera module 150 and the logic board 170. This reduces heat transfer between the camera module 150 and the logic board 170.

Figure 3:
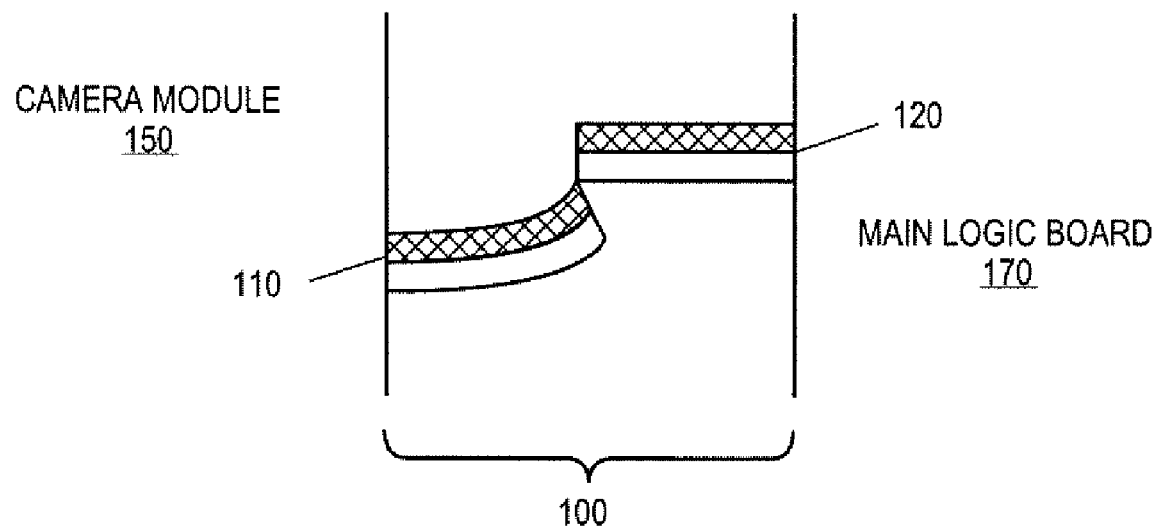
FIG. 3 shows the thermal valve when the temperature of the camera module is high and the temperature of the main logic board is low.

FIG. 3 shows the thermal valve 100 in the coupled state. The thermal valve 100 is in the coupled state when strip 110 makes contact with strip 120. In the coupled state, the thermal valve 100 thermally couples the camera module 150 and the main logic board 170. Thermally coupling the camera module 150 and the logic board 170 creates increased thermal conductance between the camera module 150 and the main logic board 170. This enhances heat transfer from the camera module 150 to the main logic board 170 through the thermal valve 100. When the temperature of the camera module 150 is high and the temperature of the main logic board 170 is low, heat is transferred from the camera module 150 to the main logic board 170 to cool the camera module 150. Transferring heat from the camera module 150 to the main logic board 170 may help bring the camera module 150 and the main logic board 170 into thermal equilibrium with each other and may help maintain the temperature of the camera module 150 within a specified range.

As shown in FIG. 1, the thermal valve 100 may be in the decoupled state when essentially no heat is being generated by the camera module 150 and the main logic board 170. For example, this may occur when both the camera module 150 and the main logic board 170 are either in the off mode or sleep mode of operation. Under this condition, the strips 110 and 120 are straight and do not contact each other. This creates decreased thermal conductance from the camera module 150 to the main logic board 170. While the temperature of the camera module 150 remains low, such as a temperature below its rated temperature, the strip 110 that is secured to the camera module 150 may remain straight and not make contact with strip 120, and the thermal valve 100 may remain in the decoupled state, regardless of whether strip 120 is straight or curved, as shown in FIG. 1 and FIG. 4.

Referring to FIG. 2, when the temperature of the camera module 150 and the temperature of the main logic board 170 are both high, such as temperatures above the rated temperature of the camera module 150, strip 110 may curve toward strip 120, and strip 120 may curve away from strip 110. Strip 110 and strip 120 thus do not contact each other, and the thermal valve 100 is in the decoupled state. This creates decreased thermal conductance between the camera module 150 and the main logic board 170.

When the temperature of the camera module 150 is high, the strip 110 that is secured to the camera module 150 may curve toward strip 120. As shown in FIG. 3, the strip 110 may make contact with the strip 120 while the temperature of the main logic board 170 is low such that the strip 120 is straight. When strip 110 makes contact with strip 120, the thermal valve 100 is in the coupled state and creates increased thermal conductance from the camera module 150 to the main logic board 170. However, if the temperature of the main logic board 170 the rises to a high level, strip 120 may curve away from strip 110, as shown in FIG. 2, so that strip 110 no longer is in contact with the strip 120. The thermal valve is now in the decoupled state, as described above in the previous paragraph. Here, it may be that the main logic board 170 has become too hot to adequately dissipate the heat being generated by the camera module 150.

In FIG. 4, the temperature of the camera module 150 is low so that the strip 110 is straight and the strips 110 and 120 do not contact each other. The thermal valve 100 is now in the decoupled state, to create decreased thermal conductance between the camera module 150 and the main logic board 170. This may represent the understanding that the camera should not be made any warmer (by the heat from the board).

Figure 5:
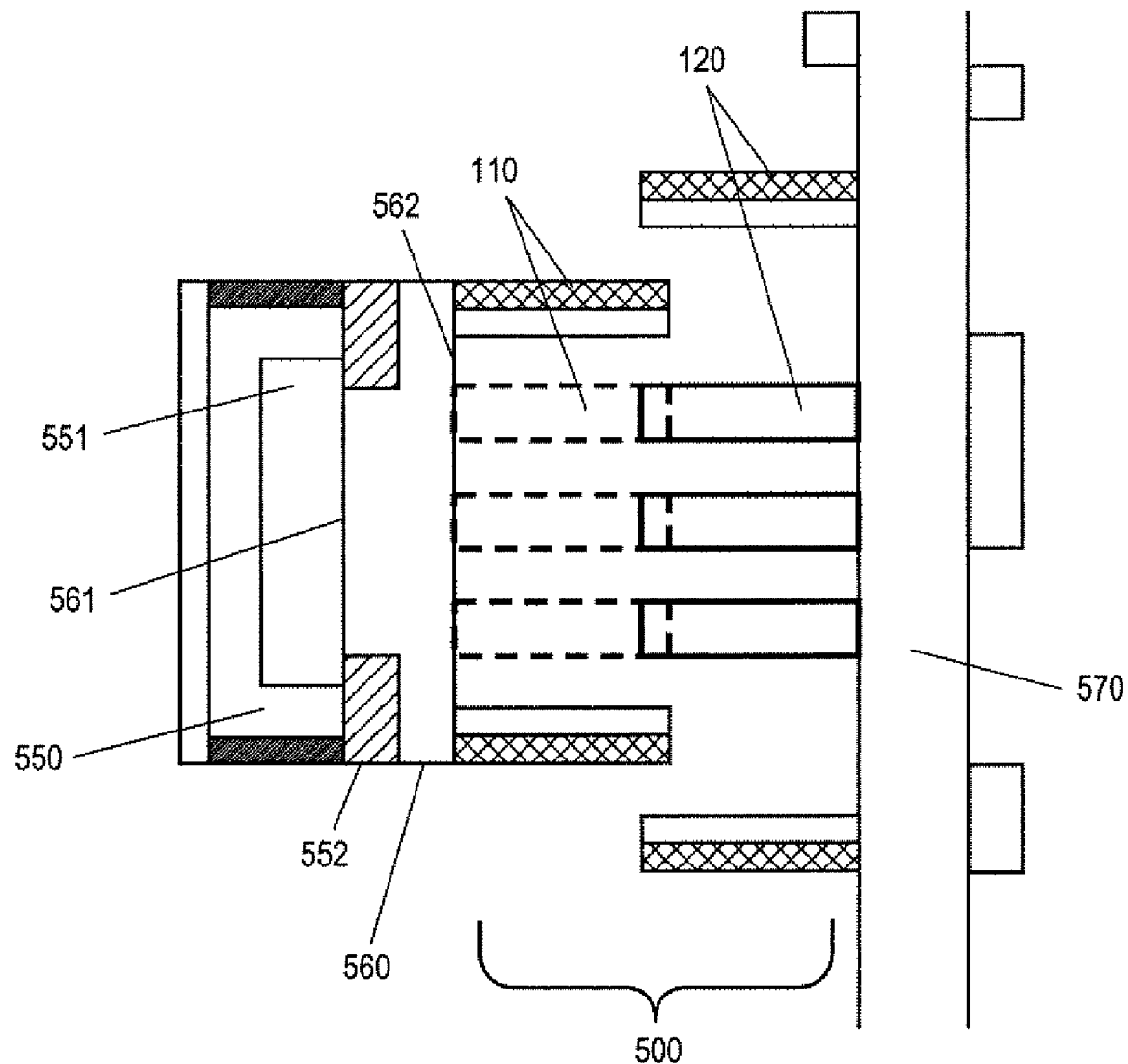
FIG. 5 shows an embodiment of the invention where the camera module and the logic board are positioned back-to-back and separated by a thermal valve.

FIG. 5 shows an embodiment of the invention where a camera module 550 and a main logic board 570 are positioned back-to-back within the housing (not shown) of a mobile device and separated by a thermal valve 500. The camera module 550 includes an image sensor chip 551 and may include a heat bridge 560. The top surface 561 of the heat bridge 560 is thermally connected to the image sensor chip 551. The heat bridge 560 extends through the base 552 of the camera module 550. The heat bridge 560 may protrude out of the bottom of the camera module 550 and extend along the bottom surface of the base 552. The bottom surface 562 of the heat bridge 560 may be thermally joined or connected to an edge of a strip 110 of the thermal valve 500. The heat bridge 560 allows heat to transfer from the image sensor chip 551 that is inside the camera module 550 to the thermal valve 500 that is outside the camera module 550. A strip 120 of the thermal valve 500 may be thermally joined or connected to the main logic board 570. The main logic board 570 may have an applications processor and memory installed on it.

Figure 6:
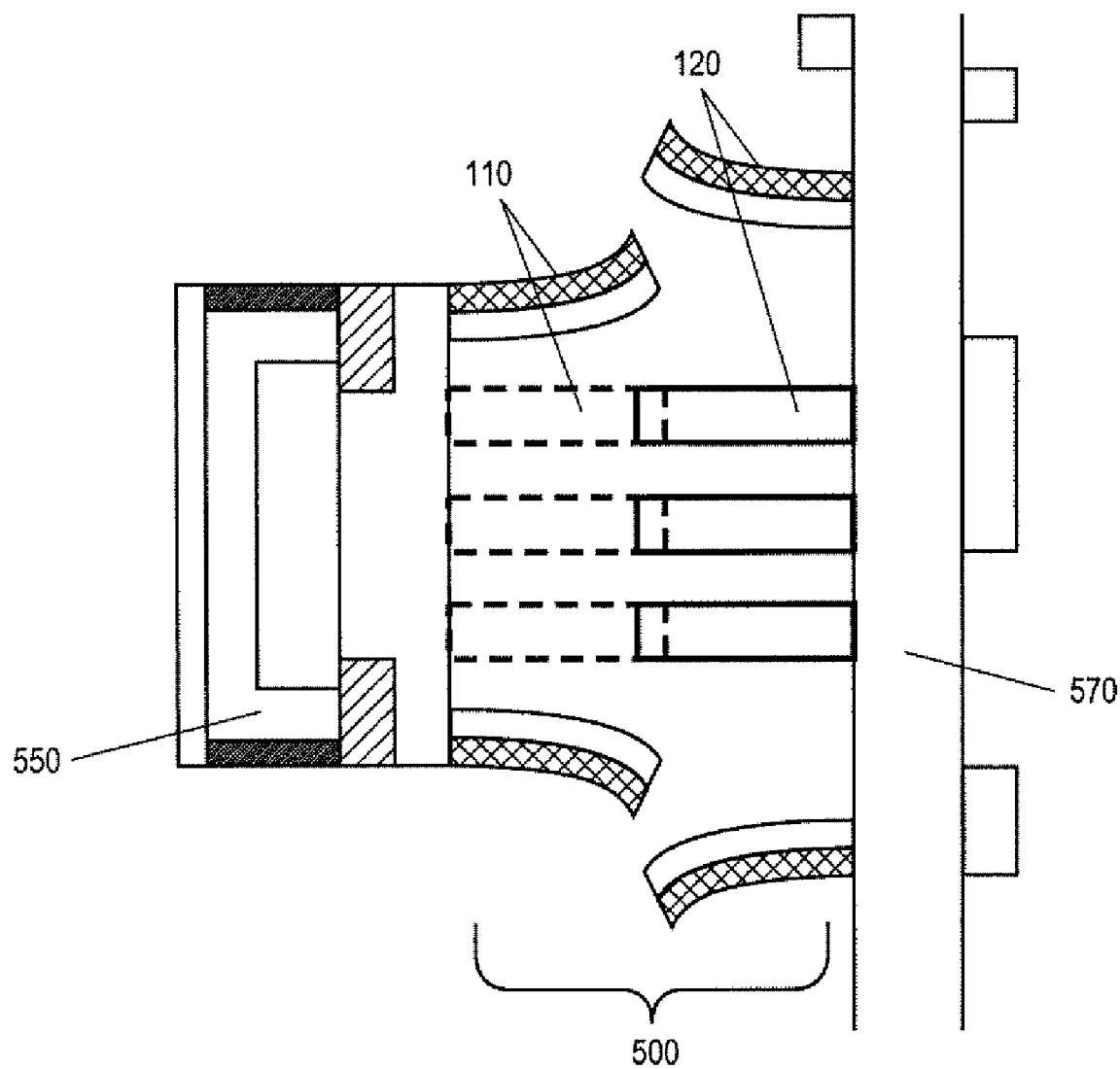
FIG. 6 shows the embodiment of FIG. 5 when the temperatures of the camera module and the logic board are both high.

As shown in FIG. 5, the thermal valve 500 may include a set of strips 110 arranged in a linear array that is secured to the camera module 550 and a set of strips 120 arranged in a linear array that is secured to the main logic board 570. For example, the set of strips 110 may be arranged along the edge of the bottom surface 562 of the heat bridge 560, and the set of strips 120 may be arranged around the strips 110, as shown in FIG. 5. Referring to FIG. 6, the strips 110 and 120 may be positioned so that they curve outwardly away from the center of the array in response to a high temperature. Each strip 110 that is secured to the camera module 550 curve toward making contact with a corresponding strip 120 that is secured to the main logic board 570, and each strip 120 curves away from making contact with the corresponding strip 110. The arrangement of strips in a linear array may provide increased heat transfer between the camera module 550 and the main logic board 570 when the thermal valve 500 is in the coupled state.

Figure 7:
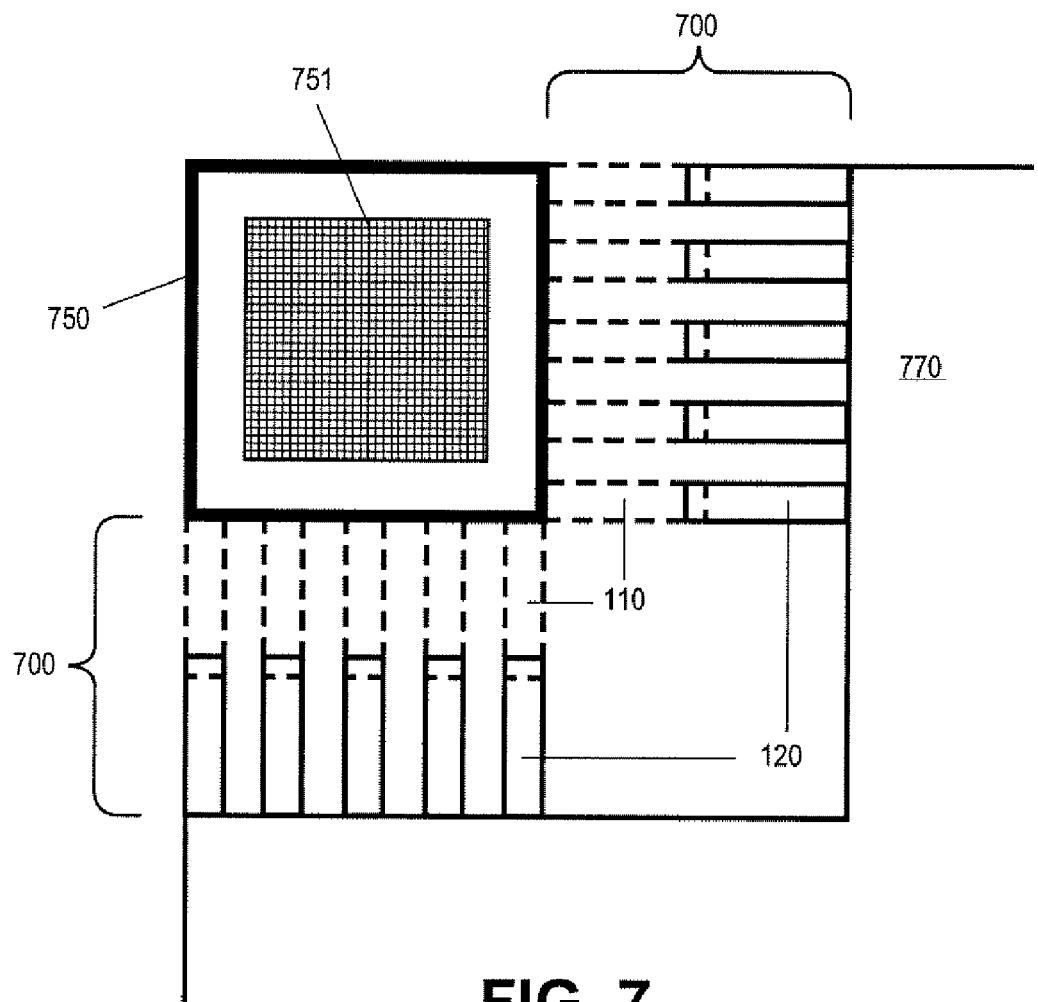
FIG. 7 shows another embodiment of the invention where the camera module and the logic board are positioned side-by-side separated by a thermal valve.
Figure 8:
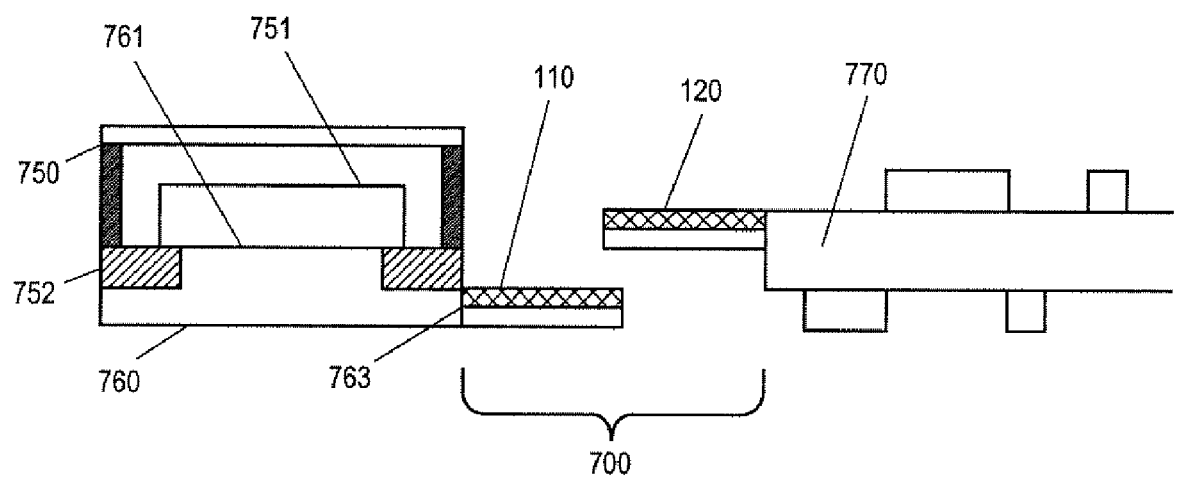
FIG. 8 is a cross-sectional view of the embodiment of FIG. 7.

FIG. 7 and FIG. 8 show another embodiment of the invention where the camera module 750 and the main logic board 770 are positioned side-by-side within a housing (not shown) of a mobile device and separated by a thermal valve 700. The camera module 750 includes an image sensor chip 751 and may include a heat bridge 760. The top surface 761 of the heat bridge 760 is thermally connected to the image sensor chip 751. The heat bridge 760 extends through the base 752 of the camera module 750. The heat bridge 760 may protrude out of the bottom of the camera module 750 and extend along the bottom surface of the base 752. The side surface 763 of the heat bridge 760 may be thermally joined or connected to a strip 110 of the thermal valve 700. The heat bridge 760 allows heat to transfer from the image sensor chip 751 that is inside the camera module 750 to the thermal valve 700 that is outside the camera module 750. A strip 120 of the thermal valve 700 may be thermally joined or connected to the main logic board 770. The main logic board 770 may have an applications processor and memory installed on it.

The thermal valve 700 may include a set of strips 110 arranged in a linear array that is secured to the camera module 750 and a set of strips 120 arranged in a linear array that is secured to the main logic board 770, as shown in FIG. 7. For example, the strips 110 may be arranged around the side surface 763 of the heat bridge 760, and the strips 120 may be arranged around an edge of the main logic board 770, as shown in FIG. 7 and FIG. 8. Each strip 110 that is secured to the camera module 750 curve toward making contact with a corresponding strip 120 that is secured to the main logic board 770, and each strip 120 curves away from making contact with the corresponding strip 110. The arrangement of strips in a linear array may provide increased heat transfer between the camera module 750 and the main logic board 770 when the thermal valve 700 is in the coupled state.

For purposes of explanation, specific embodiments were described to provide a thorough understanding of the present invention. These should not be construed as limiting the scope of the invention but merely as illustrating different examples and aspects of the invention. It should be appreciated that the scope of the invention includes other embodiments not discussed in detail above. Various other modifications, changes, and variations which will be apparent to those skilled in the art may be made in the arrangement, operation, and details of the systems and methods of the present invention disclosed herein without departing from the spirit and scope of the invention as defined in the appended claims. For instance, while the figures show the strips 110 and 120 of the thermal valve being secured directly to the electronic components, an alternative is to have the strips 110 bonded to a thermally conductive base that is then secured to the camera module and the strips 120 bonded to another thermally conductive base that is then secured to the main logic board. Therefore, the scope of the invention should be determined by the claims and their legal equivalents. Such equivalents include both currently known equivalents as well as equivalents developed in the future, i.e., any elements developed that perform the same function, regardless of structure. Furthermore, no element, component, or method step is intended to be dedicated to the public regardless of whether the element, component, or method step is explicitly recited in the claims.

What is claimed is:

1. A thermal valve, comprising:
   a first thermally conductive strip secured to a first electronic component and located between the first electronic component and a second electronic component; and
   a second thermally conductive strip secured to the second electronic component and located between the first electronic component and the second electronic component, the first strip to change its shape toward making contact with the second strip in response to a temperature increase of the first electronic component, the second strip to change its shape away from making contact with the first strip in response to a temperature increase of the second electronic component.

2. The thermal valve of claim 1 wherein the first strip includes two different thermally conductive materials laminated together, wherein the second strip includes the same two different thermally conductive materials laminated together, and wherein the two different thermally conductive materials have different coefficients of thermal expansion.

3. The thermal valve of claim 1 wherein the first strip does not contact the second strip when essentially no heat is being generated by the first electronic component and by the second electronic component.

4. The thermal valve of claim 1 wherein the first strip does not contact the second strip when a temperature of the second electronic component is above a threshold temperature.

5. The thermal valve of claim 1 wherein the first strip does not contact the second strip when a temperature of the first electronic component is below a threshold temperature.

6. The thermal valve of claim 1 wherein the first strip contacts the second strip when a temperature of the first electronic component is above a threshold temperature while a temperature of the second electronic component is below the threshold temperature.

7. The thermal valve of claim 6 wherein the second strip separates from the first strip in response to the temperature of the second electronic component increasing to a temperature that is above the threshold temperature.

8. The thermal valve of claim 6 wherein the first strip separates from the second strip in response to the temperature of the first electronic component decreasing to a temperature that is below the threshold temperature.

9. The thermal valve of claim 1 further comprising a plurality of said first strips arranged in a linear array and a plurality of said second strips arranged in a linear array.

10. A apparatus, comprising:
    a mobile communications handset housing having integrated therein
    a camera module,
    a main logic board having an applications processor and memory installed thereon, and
    a thermal valve having a plurality of states responsive to a temperature of the camera module and a temperature of the main logic board, the plurality of states including a coupled state where the thermal valve thermally couples the camera module and the main logic board and a decoupled state where the thermal valve thermally decouples the camera module and the main logic board.

11. The apparatus of claim 10 wherein the thermal valve is in the decoupled state when essentially no heat is being generated by the camera module and the main logic board.

12. The apparatus of claim 10 wherein the thermal valve is in the decoupled state when the temperature of the main logic board is above a threshold temperature.

13. The apparatus of claim 10 wherein the thermal valve is in the decoupled state when the temperature of the camera module is below a threshold temperature.

14. The apparatus of claim 10 wherein the thermal valve is in the coupled state when the temperature of the camera module is above a threshold temperature while the temperature of the main logic board is below the threshold temperature.

15. The apparatus of claim 10 wherein the thermal valve includes a first thermally conductive strip secured to the camera module and a second thermally conductive strip secured to the main logic board, the first strip to curve in response to the temperature of the camera module increasing, the second strip to curve in response to the temperature of the main logic board increasing.

16. The apparatus of claim 15 wherein the thermal valve is in the decoupled state when the first strip is straight.

17. The apparatus of claim 15 wherein the thermal valve is in the decoupled state when the second strip curves away from the first strip.

18. The apparatus of claim 15 wherein the thermal valve is in the coupled state when the first strip curves toward the second strip and makes contact with the second strip while the second strip is straight.

19. The apparatus of claim 15 wherein the thermal valve includes a plurality of said first strips arranged in a linear array and a plurality of said second strips arranged in a linear array.

20. A method for modifying a thermal connection between a camera module and an active electronic component inside a housing of an electronic device, comprising:
    creating increased thermal conductance from the camera module to the active electronic component when a temperature of the camera module is above a threshold temperature while a temperature of the active electronic component is below the threshold temperature; and
    creating decreased thermal conductance from the camera module to the active electronic component when the temperature of the active electronic component is above the threshold temperature.

21. The method of claim 20 further comprising creating decreased thermal conductance from the camera module to the active electronic component when essentially no heat is being generated by the camera module and the active electronic component.

22. The method of claim 20 further comprising creating decreased thermal conductance from the camera module and the active electronic component when the temperature of the camera module is below the threshold temperature.

23. The method of claim 20 wherein creating decreased thermal conductance comprises creating a separation between a first thermally conductive strip that is secured to the camera module and a second thermally conductive strip that is secured to the active electronic component.

24. The method of claim 20 wherein creating increased thermal conductance comprises creating contact between a first thermally conductive strip that is secured to the camera module and a second thermally conductive strip that is secured to the active electronic component.

25. The method of claim 24 wherein the first strip includes two different thermally conductive materials laminated together, wherein the second strip includes the same two different thermally conductive materials laminated together, and wherein the two different thermally conductive materials have different coefficients of thermal expansion to allow the first strip and the second strip to curl in response to an increase in temperature.

\* \* \* \* \*